United States Patent Office 2,849,455
Patented Aug. 26, 1958

2,849,455

ALPHA-ETHYL-PIPERONYL ETHER OF HYDROXYALKANAMIDES

Edward A. Prill, Yonkers, N. Y., assignor to Boyce Thompson Institute for Plant Research, Inc., a corporation of New York No Drawing. Application July 19, 1955
Serial No. 523,099

4 Claims. (Cl. 260—340.5)

This invention relates to organic compounds and has for its object the provision of a new class of organic compounds represented by the formula

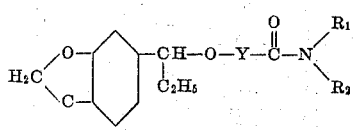

wherein Y is a member of the group of alkylene radicals represented by the formulas —$CH_2$—$CH_2$—$CH_2$—

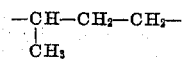

—$CH_2$— and

$R_1$ and $R_2$ are members of the group consisting of the hydrogen atom, alkyl, cycloalkyl, alkoxyalkyl and aralkyl radicals and not more than one of $R_1$ and $R_2$ is hydrogen.

This application is a continuation-in-part of my application Serial No. 384,523, filed October 6, 1953, now Patent No. 2,773,062.

The compounds of this invention are useful as insecticides, particularly as synergists and extenders for pyrethrins, 3-allyl-2-methyl-4-oxo-2-cyclopentenyl chrysanthemummonocarboxylate which is commonly called allethrin and is so hereinafter referred to and structurally related insecticides.

The compounds of the present invention may be easily prepared from readily available starting materials and they are free from objectionable odors and irritations. All of the compounds given in the following specific examples are viscous oily liquids. When used in formulations, the compounds prepared as described herein contribute negligible coloration.

For convenience in describing the various specific examples, the compounds are divided into three groups. In preparing the compounds the last reaction step is the same and involves the reaction of isosafrole hydrochloride with a compound containing an alcoholic hydroxyl radical. The following is a convenient laboratory process for carrying out the last step.

The intermediary hydroxy compound, plus an inert mutual reaction solvent when needed, was placed in an Erlenmeyer flask to form a shallow layer. To this was added to drop of triethylamine and an excess of powdered sodium bicarbonate. A slight molecular excess of isosafrole hydrochloride was slowly added with frequent shaking and external cooling to prevent a temperature rise above about 50° C. The reaction was allowed to continue at room temperature for one or two days. Then sufficient β-diethylamino-ethanol was added to tie up any remaining isosafrole hydrochloride to form the compound

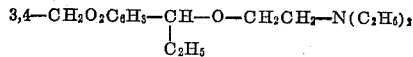

which could later be removed by washing with aqueous acid. In commercial practice the remaining isosafrole hydrochloride could be tied up by reaction with any reactive hydroxy compound, such as methyl or ethyl alcohol. The reaction mixture was subjected to steam distillation to remove volatile impurities, the oily residue was taken up in ethyl ether, washed with dilute hydrochloric acid, then washed with sodium bicarbonate. After drying over anhydrous sodium sulfate and removal of the solvent, the compound was obtained in substantially pure form. This reaction step constitutes the formation of a mixed ether in which the ethereal oxygen atom is attached on one side to the α-ethylpiperonyl radical and on the other side to the organic radical from the intermediary hydroxy compound used.

Distillation temperatures are given in degrees centigrade at the indicated millimeters of mercury pressure.

EXAMPLES OF GROUP I COMPOUNDS OF THE GENERAL FORMULA

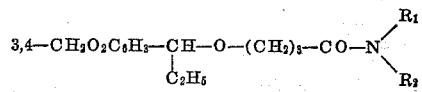

These were made by the following general method. About equimolar quantities of γ-butyrolacetone and the indicated amine were heated together at 140° to 175° C. for 24 to 48 hours. If not too high boiling the intermediary N-substituted amide of α-hydroxy butyric acid (the hydroxy amide) was distilled under reduced pressure. The higher members were not distilled but were purified by removal of the unreacted butyrolacetone and amine by washing with dilute hydrochloric acid. In each case the hydroxy amide was reacted with isosafrole hydrochloride in the previously described manner.

*Example 1.*—$R_1$ is 2-ethylhexyl, $R_2$ is H. Made by the use of 2-ethylhexylamine. The hydroxy amide was distilled at about 175°/4.

*Example 2.*—$R_1$ and $R_2$ are each n-butyl. Made by the use of di-n-butyl amine. The hydroxy amide was distilled at 145–150°/5.

*Example 3.*—$R_1$ is tetrahydrofurfuryl, $R_2$ is H. Made by the use of tetrahydrofurfurylamine. The hydroxy amide distilled at 160–165°/5.

*Example 4.*—$R_1$ is cyclohexyl, $R_2$ is H. Made by the use of cyclohexylamine. The hydroxy amide distilled at 170–185°/5.

*Example 5.*—$R_1$ is n-hexyl, $R_2$ is H. Made by the use of n-hexylamine. The hydroxy amide was distilled at 160–180°/10.

*Example 6.*—$R_1$ is 3-isopropoxypropyl, $R_2$ is H. Made by the use of 3-isopropoxypropylamine. The intermediary hydroxy amide was distilled at 155–165°/4.

*Example 7.*—$R_1$ is furfuryl, $R_2$ is H. Made by the use of furfurylamine. The intermediary hydroxy amide was distilled at 170–180°/4.

*Example 8.*—$R_1$ is 3,5,5-trimethylhexyl, $R_2$ is H. Made by the use of 3,5,5-trimethylhexylamine.

*Example 9.*—$R_1$ is β-phenylethyl, $R_2$ is H. Made by the use of β-phenylethylamine.

*Example 10.*—$R_1$ is benzyl, $R_2$ is H. Made by the use of benzylamine.

EXAMPLES OF GROUP 2 COMPOUNDS OF THE GENERAL FORMULA

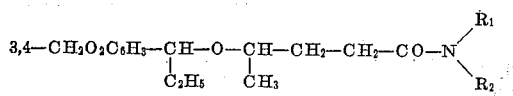

These were made in the same manner as the compounds of group I except that γ-valerolactone was used in place of γ-butyrolactone.

*Example 11.*—$R_1$ and $R_2$ are each n-butyl. Made by the use of di-n-butylamine. The intermediary hydroxy amide was distilled at 155–160°/4.

*Example 12.*—$R_1$ is furfuryl, $R_2$ is H. Made by the use of furfurylamine. The intermediary hydroxy amide was distilled at 170–180°/5.

*Example 13.*—$R_1$ is cyclohexyl, $R_2$ is H. Made by the use of cyclohexylamine.

*Example 14.*—$R_1$ is 2-ethylhexyl, $R_2$ is H. Made by the use of 2-ethylhexylamine.

*Example 15.*—$R_1$ is 3,5,5-trimethylhexylamine, $R_2$ is H. Made by the use of 3,5,5-trimethylhexylamine.

EXAMPLES OF GROUP 3 COMPOUNDS

*Example 16.*—

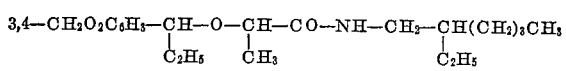

A mixture of 29 g. of ethyl lactate and 65 g. of 2-ethylhexylamine was refluxed for 24 hours. The mixture was distilled and 40 g. of N-2-ethylhexylamide of lactic acid was collected at 149–151°/4. This hydroxy amide was then reacted with ososafrole hydrochloride in the manner already indicated.

*Example 17.*—

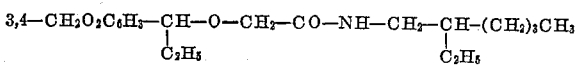

A mixture of 30 g. of ethyl glycolate and 52 g. of 2-ethylhexylamine was heated at 175° for 40 hours. The mixture was washed with dilute hydrochloric acid and then distilled whereupon 37 g. of the N-2-ethylhexylamide of glycolic acid was collected at 140–150°/4. This hydroxy amide was then reacted with isosafrole hydrochloride in the already indicated manner.

The test solutions were made by dissolving the toxicants in a refined petroleum distillate with not more than 5 percent acetone added as a co-solvent. The results of the tests are given in the table.

It is desirable to use the compounds of the invention together with pyrethrins, allethrin or structurally related insecticides because they act as synergists or extenders for the more expensive latter insecticides.

The compounds of this invention and insecticidal compositions containing the same have been illustrated as being very effective against houseflies. However, these compositions can also be used very effectively against other insect pests.

The effectiveness of compositions of the compounds of the invention using a petroleum distillate as the carrier has been illustrated, but the effective formulations are not limited to this carrier. Other effective carriers are water, in which the compounds are emulsified by means of an emulsifying agent; a liquefiable gas, such as, for example, Freon, in which the compounds are dissolved for the purpose of being used as an aerosol; finely divided solid matter, such as, for example, diatomaceous earth and talc, by which the compounds are absorbed or adsorbed; and the like.

Compositions containing the compounds of the invention may be effectively applied, for example, as space sprays, or as residual deposits on or about such objects as living plants, living animals, stored products, and the like, in order to protect these from insect pests.

Table

RESULTS OF PEET-GRADY TESTS ON COMPOUNDS PLUS ADDED PYRETHRINS OR ALLETHRIN

| Compound of Example No. | Formulation | | | Results | | OTI | |
|---|---|---|---|---|---|---|---|
| | Compound, g. per 100 ml. | Pyrethrins, g. per 100 ml. | Allethrin, g. per 100 ml. | 24 hr. kill, percent | 10 min. knockdown, percent | 24 hr. kill, percent | 10 min. knockdown, percent |
| 1 | .4 | .05 | | 62 | 93 | 27 | 93 |
| 1 | .4 | | .05 | 43 | 93 | 27 | 93 |
| 2 | .4 | .05 | | 51 | 84 | 24 | 93 |
| 2 | .4 | | .05 | 47 | 90 | 24 | 93 |
| 3 | .4 | .05 | | 79 | 97 | 61 | 98 |
| 3 | .4 | | .05 | 82 | 96 | 61 | 98 |
| 4 | .4 | .05 | | 92 | 95 | 61 | 98 |
| 4 | .4 | | .05 | 90 | 98 | 61 | 98 |
| 5 | .4 | .05 | | 88 | 95 | 61 | 98 |
| 5 | .4 | | .05 | 80 | 95 | 61 | 98 |
| 6 | .4 | .05 | | 95 | 98 | 33 | 97 |
| 6 | .4 | | .05 | 78 | 98 | 33 | 97 |
| 7 | .4 | .05 | | 48 | 92 | 33 | 97 |
| 7 | .4 | | .05 | 56 | 95 | 33 | 97 |
| 8 | .4 | .05 | | 96 | 98 | 33 | 97 |
| 8 | .4 | | .05 | 78 | 97 | 33 | 97 |
| 9 | .4 | .05 | | 67 | 97 | 53 | 97 |
| 9 | .4 | | .05 | 50 | 94 | 53 | 97 |
| 10 | .4 | .05 | | 77 | 95 | 39 | 97 |
| 10 | .4 | | .05 | 67 | 95 | 39 | 97 |
| 11 | .25 | .025 | | 83 | 99 | 77 | 99 |
| 12 | .4 | .05 | | 79 | 97 | 61 | 98 |
| 12 | .4 | | .05 | 82 | 96 | 61 | 98 |
| 13 | .4 | .05 | | 92 | 98 | 39 | 97 |
| 13 | .4 | | .05 | 83 | 97 | 39 | 97 |
| 14 | .2 | .05 | | 70 | 98 | 50 | 99 |
| 14 | .2 | | .05 | 69 | 95 | 50 | 99 |
| 15 | .2 | .05 | | 53 | 86 | 40 | 92 |
| 16 | .4 | .05 | | 72 | 97 | 45 | 98 |
| 16 | .4 | | .05 | 63 | 96 | 45 | 98 |
| 17 | .4 | .05 | | 55 | 92 | 44 | 96 |

I claim:

1. The compound represented by the formula

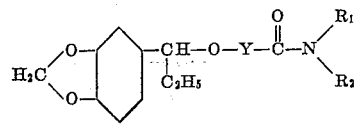

wherein Y is a member of the group of alkylene radicals represented by the formulas —$CH_2$—$CH_2$—$CH_2$—

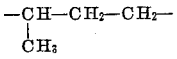

—$CH_2$—, and

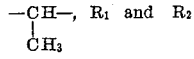

$R_1$ and $R_2$ are members of the group consisting of the hydrogen atom, alkyl, cycloalkyl radicals of the cyclohexane series, alkoxyalkyl and aralkyl radicals containing not more than 10 carbon atoms, and not more than one of $R_1$ and $R_2$ is hydrogen.

2. The compound of claim 1 wherein Y is

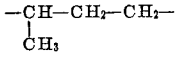

$R_1$ is hydrogen and $R_2$ is cyclohexyl.

3. The compound of claim 1 wherein Y is

—$CH_2$—$CH_2$—$CH_2$—

$R_1$ is hydrogen and $R_2$ is 2-ethylhexyl.

4. The compound of claim 1 wherein Y is

—$CH_2$—$CH_2$—$CH_2$—

$R_1$ is hydrogen and $R_2$ is 3-isopropoxypropyl.

References Cited in the file of this patent

UNITED STATES PATENTS

| | | |
|---|---|---|
| 2,456,316 | Prill | Dec. 14, 1948 |
| 2,456,991 | Prill | Dec. 21, 1948 |
| 2,485,600 | Hedenburg | Oct. 25, 1949 |
| 2,485,681 | Wachs | Oct. 25, 1949 |
| 2,523,233 | Prill | Sept. 19, 1950 |

UNITED STATES PATENT OFFICE
Certificate of Correction

Patent No. 2,849,455                          August 26, 1958

Edward A. Prill

It is hereby certified that error appears in the printed specification of the above numbered patent requiring correction and that the said Letters Patent should read as corrected below.

Column 1, lines 19 to 24 inclusive, the formula should appear as shown below instead of as in the patent—

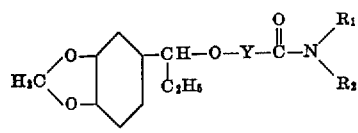

Signed and sealed this 4th day of November 1958.

[SEAL]

Attest:
KARL H. AXLINE,
*Attesting Officer.*

ROBERT C. WATSON,
*Commissioner of Patents.*